May 8, 1923.
L. MELANOWSKI
CAST METAL WHEEL
Filed April 22, 1920
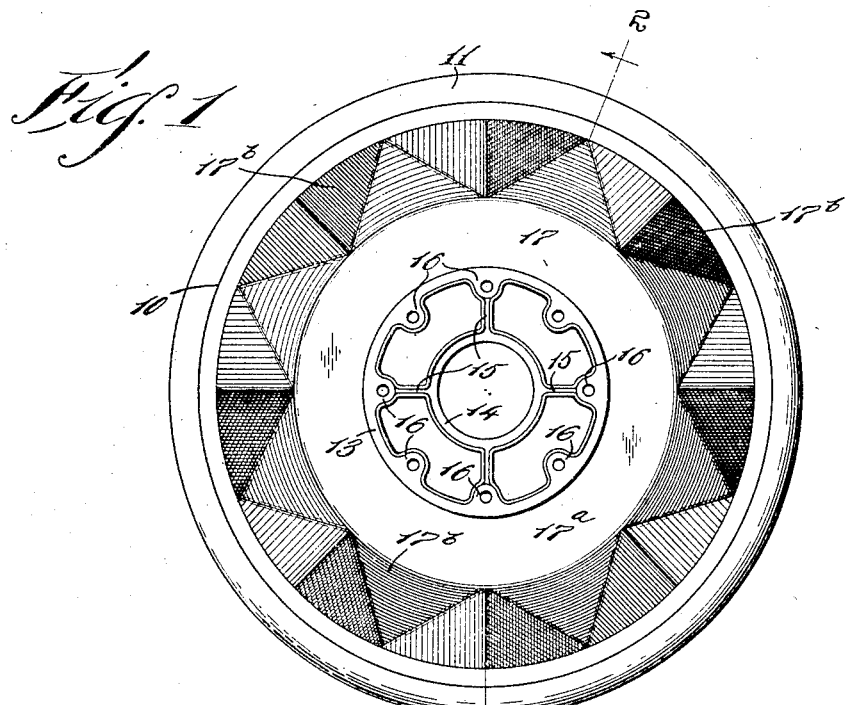
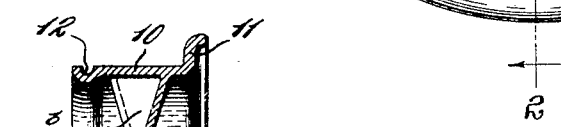
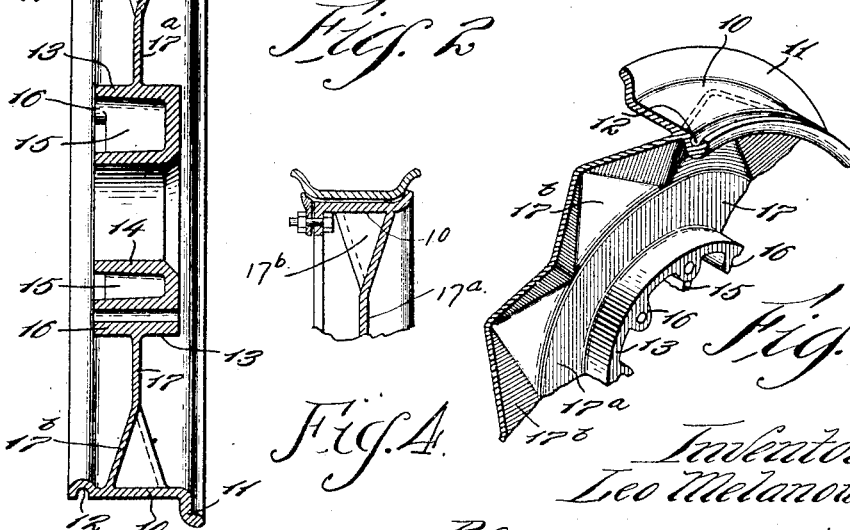
Inventor
Leo Melanowski Patented May 8, 1923.

1,454,249

UNITED STATES PATENT OFFICE.

LEO MELANOWSKI, OF CLEVELAND, OHIO, ASSIGNOR OF ONE-THIRD TO WARREN H. COWDERY AND ONE-THIRD TO GEORGE B. DURELL, BOTH OF CLEVELAND, OHIO.

CAST-METAL WHEEL.

Application filed April 22, 1920. Serial No. 375,670.

*To all whom it may concern:*

Be it known that I, LEO MELANOWSKI, a citizen of the United States, residing at Cleveland, in the county of Cuyahoga and State of Ohio, have invented a certain new and useful Improvement in Cast-Metal Wheels, of which the following is a full, clear, and exact description, reference being had to the accompanying drawings.

This invention relates generally to wheels and more particularly to a cast metal wheel intended for use in connection with motor vehicles of every description.

One object of the invention is to provide a cast metal wheel which shall be exceedingly light and at the same time possess great strength capable of carrying heavy loads and withstanding lateral strains and stresses. Another object of the invention is to provide a cast metal wheel of such a character that cores can be dispensed with and metal molds employed if desired and a still further object is to provide a cast metal wheel in which aluminum, malleable iron or other suitable metal may be employed as a casting material; and a still further object is to provide a wheel of such a nature that crystallization shrinkages will be corrected or avoided during the casting operation.

With these various objects in view, the invention consists in the details of construction hereinafter fully described and set forth in the appended claims.

In the drawings forming a part of this specification, Fig. 1 is a face view of a cast metal wheel embodying my invention; Fig. 2 is a sectional view taken on the line 2—2 of Fig. 1; and Fig. 3 is a perspective view of a portion of the wheel. Fig. 4 is a detail sectional view showing a slight modification.

In making a wheel in accordance with my invention, I provide a hub, a periphery or fixed rim and a connecting web all integral and preferably cast from a suitable alloy of aluminum although it will be understood that malleable iron or any other suitable metal may be employed and in practice I prefer to make the felly or fixed rim as thin and light as possible consistent with good molding practice and having due regard for the loads the wheels are intended to carry and the lateral stresses and strains to which they will be subjected. The periphery or fixed rim 10 is preferably shaped to receive a tire directly thereon and is therefore formed with a tire retaining flange 11 at the inner side and a circumferential groove 12 at the outer side which groove is adapted to receive the usual construction of detachable tire retaining ring (not shown). The intervening space constitutes the rim base upon which the tire rests.

In case it is desired to use a demountable tire carrying rim upon my improved construction of cast metal wheel, the periphery 10 will be shaped substantially the same as the usual commercial felly band now in use and any suitable form of securing means may be employed to connect the demountable tire carrying rim to the wheel body as shown in Fig. 4.

The hub is made as light as possible and with this object in view preferably composed of an outer ring 13, an inner ring 14, and a plurality of radial connecting ribs 15; and where the ribs 15 meet the outer ring 13, I may provide bosses or enlargements 16 which are bored to receive bolts for connecting the hub flanges and brake drums to the cast metal hub.

The hub and periphery or fixed rim are connected by an integral web 17 which may be described as being partly flat and partly corrugated or fluted, that portion of the web adjacent the hub being flat as shown at 17ª while the portion adjacent the periphery or fixed rim is corrugated or fluted as shown at 17ᵇ the corrugations or flutes being along radial lines and it will be noted that one angle or apex is upon the inner side of the wheel while the next one is upon the outer side of the wheel, or in other words, said angles or apices are arranged alternately. In practice I prefer to have the flat portion of the web united with the hub approximately midway its length but it will be understood that it may be united with the hub at some other point if found desirable.

The web as a whole may be of uniform thickness throughout or it may be made thick at the hub and gradually diminishing towards the periphery. In practice the periphery is made slightly wider than the corrugated portion of the web and also wider than the hub in order to provide a proper width of rim base for the tire without materially adding to the weight of the wheel body as a whole. By making the wheel as herein shown and described I provide an exceedingly strong and durable cast metal wheel and at the same time maintain the weight thereof at the lowest possible point.

Furthermore, the peculiar formation of the web tends to clear itself of mud and dirt to a remarkable degree.

Having thus described my invention, what I claim is:—

1. A cast metal automobile wheel comprising a hub portion, a peripheral tire carrying portion and a connecting web portion, a portion of said web being flat and a portion of said web being corrugated or fluted, said hub, web and periphery being integral.

2. A cast metal automobile wheel comprising a hub portion, a peripheral tire carrying portion and a connecting web portion, the inner portion of said web being flat and the outer portion of said web being corrugated or fluted.

3. A cast metal wheel for automobiles comprising a hub portion, a peripheral tire carrying portion and a web portion, the outer portion of said web being corrugated along radial lines, the inner portion being flat.

4. A cast metal wheel for automobiles comprising a hub portion, a peripheral tire receiving portion and a connecting web portion, the outer portion of said web being corrugated upon radial lines, the inner portion of said web being flat and lying in a plane transverse to the axis of the wheel body, the peripheral portion being wider than the hub portion.

5. A cast metal wheel for automobiles comprising a hub portion, a peripheral portion having tire receiving flanges and a connecting web portion, the inner portion of said web being flat and the outer portion of said web being corrugated along radial lines.

In testimony whereof, I hereunto affix my signature.

LEO MELANOWSKI.